(12) United States Patent
Aberer et al.

(10) Patent No.: US 7,218,716 B2
(45) Date of Patent: May 15, 2007

(54) APPARATUS AND METHOD FOR SWITCHING INCOMING CALLS THROUGH TO SUBSCRIBERS OF A TELECOMMUNICATIONS NETWORK

(75) Inventors: Bernd Aberer, Munich (DE); Dietmar Ratzberger, Haidershof (AT); Francois Pesty, Pullach (DE)

(73) Assignee: Siemens Aktiengesellschaft, Munich (DE)

( * ) Notice: Subject to any disclaimer, the term of this patent is extended or adjusted under 35 U.S.C. 154(b) by 519 days.

(21) Appl. No.: 10/096,173

(22) Filed: Mar. 11, 2002

(65) Prior Publication Data

US 2002/0181687 A1 Dec. 5, 2002

(30) Foreign Application Priority Data

Mar. 9, 2001 (DE) ................. 101 11 495

(51) Int. Cl.
*H04M 3/42* (2006.01)
(52) U.S. Cl. .............................. 379/207.04; 379/211.02
(58) Field of Classification Search ........... 379/207.04, 379/219, 265.01–265.14, 211.01, 211.02, 379/212.01, 214.01, 218.02
See application file for complete search history.

(56) References Cited

U.S. PATENT DOCUMENTS

| | | | | | |
|---|---|---|---|---|---|
| 3,928,732 | A | * | 12/1975 | Simon et al. | 379/164 |
| 4,783,796 | A | * | 11/1988 | Ladd | 379/88.19 |
| 5,261,061 | A | * | 11/1993 | Ju | 379/27.07 |
| 5,572,577 | A | * | 11/1996 | Harrila | 379/88.22 |
| 5,805,692 | A | * | 9/1998 | Oerlemans et al. | 379/225 |
| 6,052,461 | A | * | 4/2000 | Lam | 379/297 |
| 6,094,479 | A | * | 7/2000 | Lindeberg et al. | 379/220.01 |
| 6,161,134 | A | * | 12/2000 | Wang et al. | 709/220 |
| 6,671,366 | B1 | * | 12/2003 | Isotalo | 379/221.08 |
| 2002/0159577 | A1 | * | 10/2002 | Vardi et al. | |
| 2003/0215080 | A1 | * | 11/2003 | Wengrovitz | |

* cited by examiner

*Primary Examiner*—William J. Deane, Jr.
(74) *Attorney, Agent, or Firm*—Bell, Boyd & Lloyd LLP

(57) ABSTRACT

A switchboard apparatus and method for a telecommunications system, for switching incoming calls through to subscribers, with an input device for entering connection data of a required subscriber, a condition device for determining the telephone condition of the required subscriber, and a switching device, which automatically forwards the incoming call to the required subscriber.

13 Claims, 5 Drawing Sheets

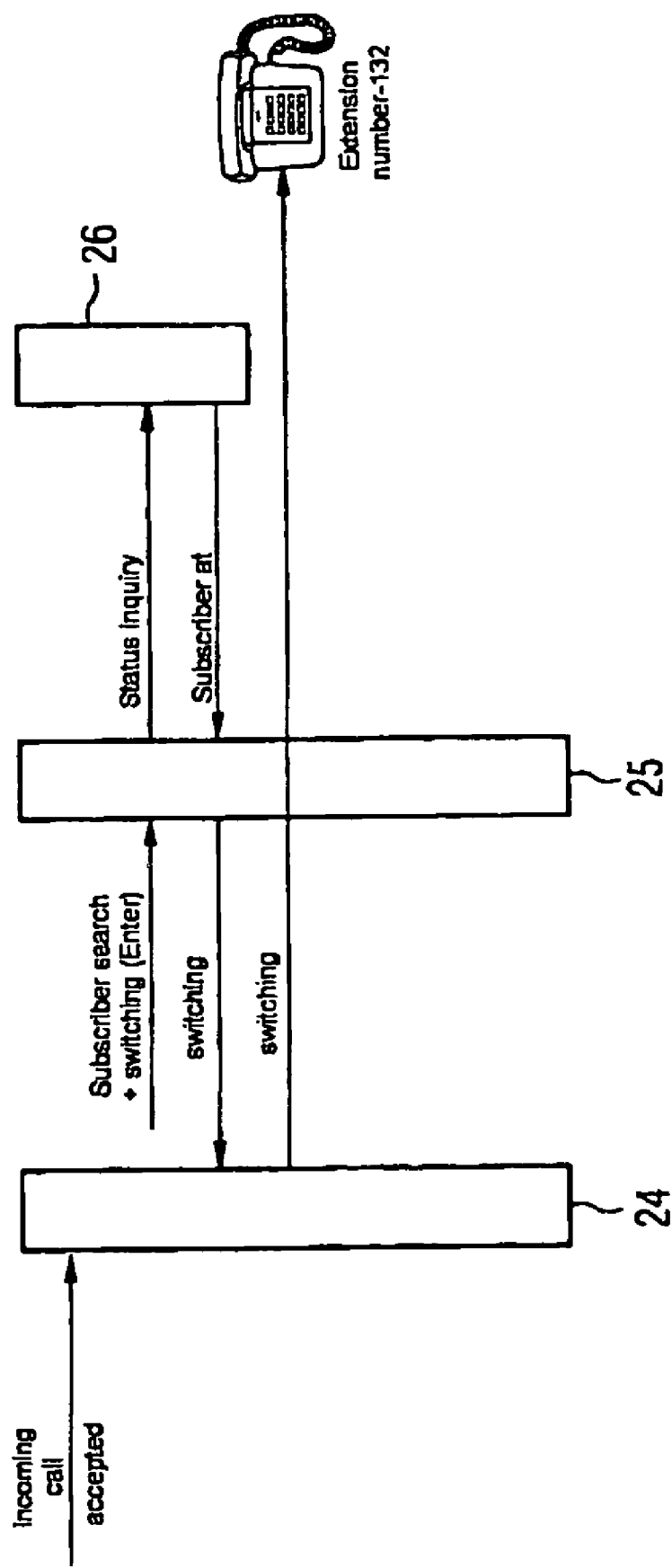

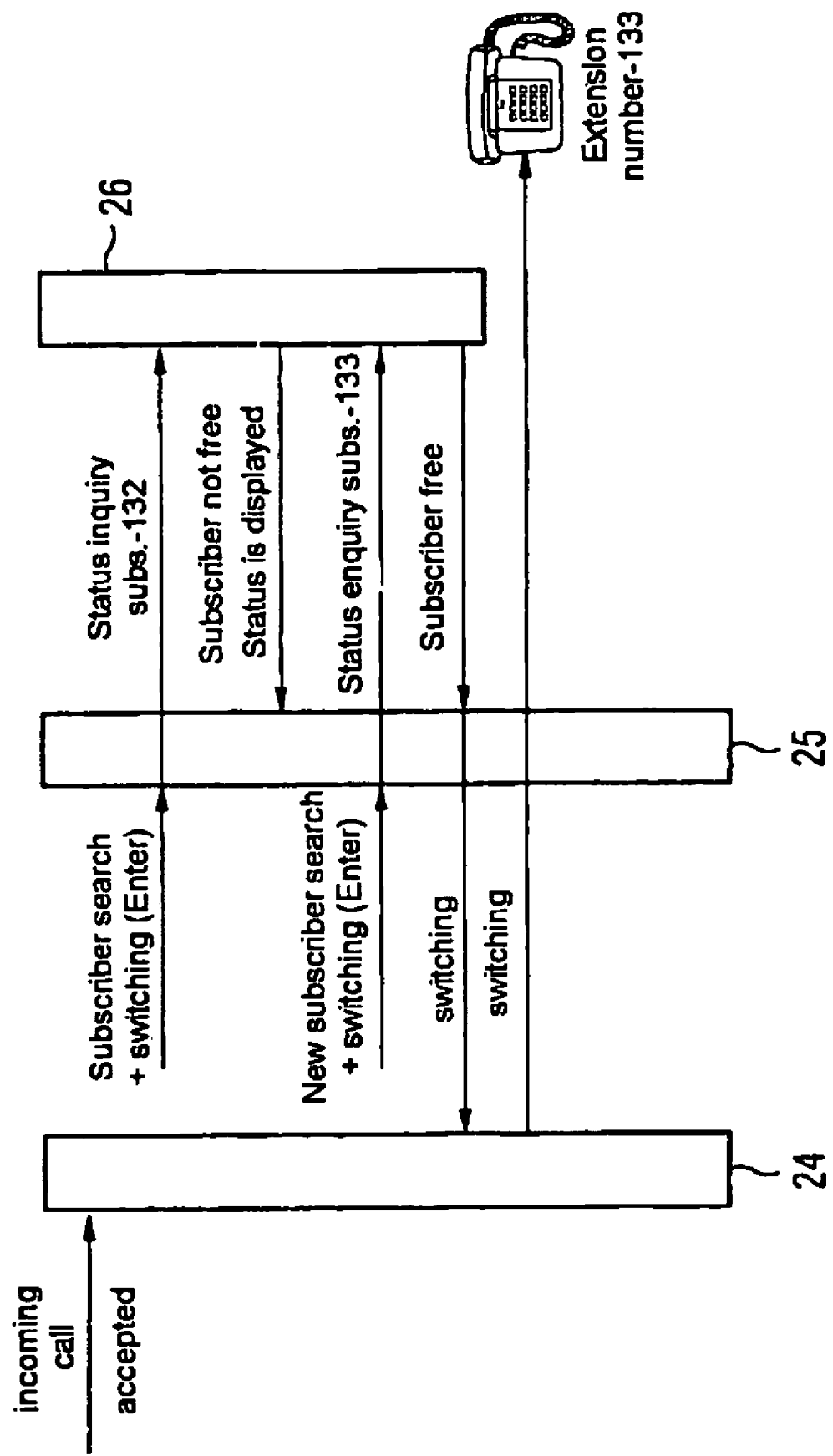

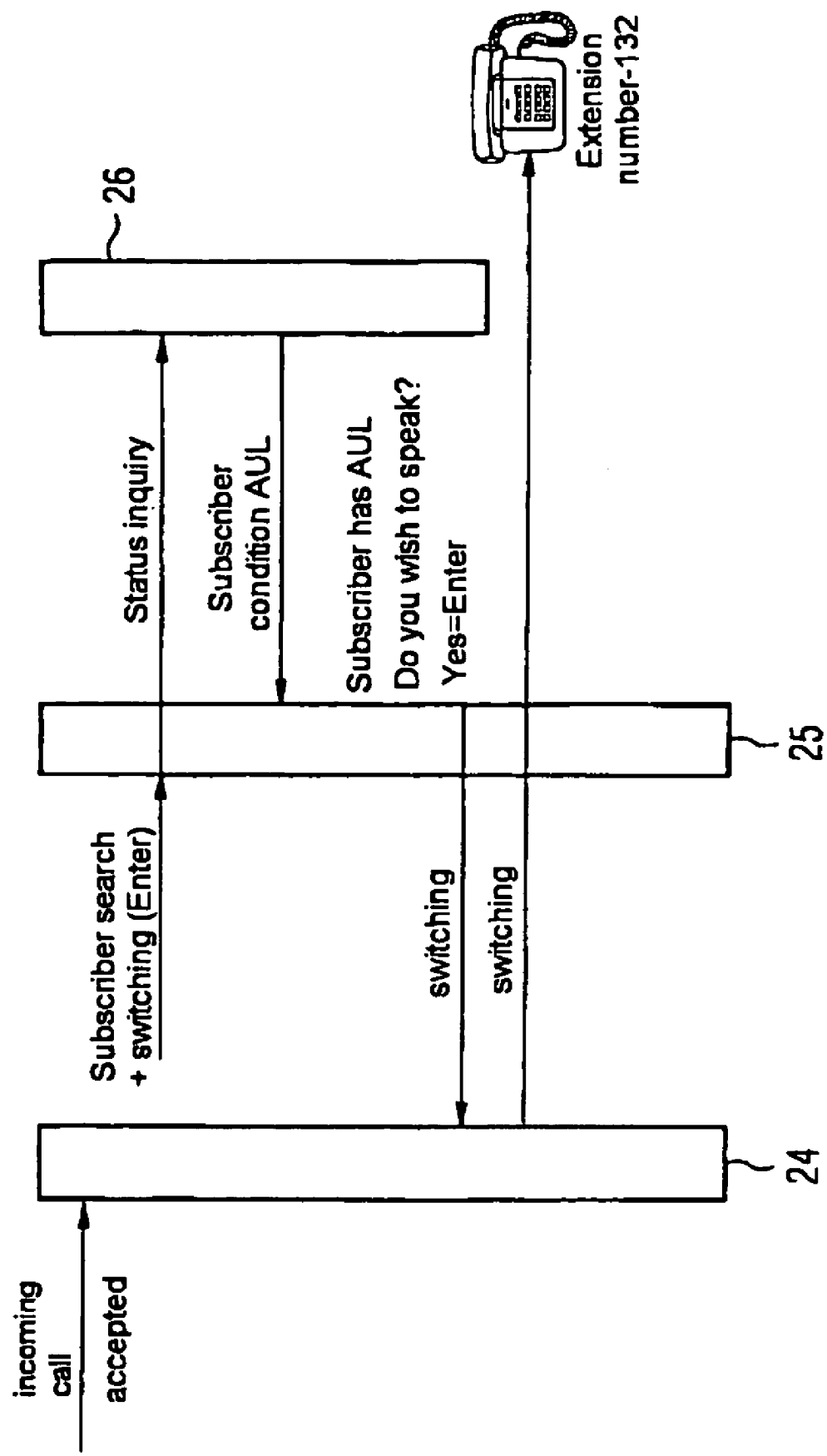

APPARATUS AND METHOD FOR SWITCHING INCOMING CALLS THROUGH TO SUBSCRIBERS OF A TELECOMMUNICATIONS NETWORK

BACKGROUND OF THE INVENTION

The present invention relates to a switchboard apparatus for a telecommunications system, for switching incoming calls through to subscribers of a telecommunications network, and a method for switching incoming calls through to subscribers of a telecommunications network.

An external caller has the facility to be switched through to his/her required call party, referred to below as the required subscriber, via a switchboard apparatus of a telecommunications system, such as in a private telecommunications network of a company, via a switchboard operator.

In state-of-the-art systems, the switchboard operator has, on the one hand, the facility to place the caller in a queue loop. The switchboard operator then calls the required subscriber in order to establish whether, for example, the required subscriber's line is free or busy, or whether the required subscriber has diverted his/her line to an answering machine. Only when this inquiry has been made is the caller switched through to the required subscriber, if the required subscriber's line is free.

The disadvantage of this method, however, is that the caller loses valuable time, since the caller, for example, must bear the cost of the time spent in the queue loop. Furthermore, the switchboard operator on the switchboard apparatus also loses time, since he/she is unable to switch further calls during this time. Furthermore, substantial input is required from the switchboard operator to ensure that the call is switched correctly in the event of "Busy" or "Call diversion" call conditions.

On the other hand, the switchboard operator on the switchboard apparatus has the facility to perform "Instant switching". In this case, the incoming call is forwarded without an inquiry to the required subscriber's line. This type of switching is faster than switching with an inquiry, but has the disadvantage that the caller, following what may be costly waiting time, is reconnected to the switchboard apparatus because the required subscriber's line is busy, or the caller does not wish to leave a message on an answering machine of the required subscriber.

An object of the present invention is, therefore, to provide a switchboard apparatus for a telecommunications system and a method applied in this switchboard apparatus, via which more effective switching of an incoming call through to a required subscriber is achieved, so that the incoming call is switched through to the required subscriber in the shortest possible time.

SUMMARY OF THE INVENTION

According to the present invention, the switchboard operator has the facility to ascertain the telephone condition of the required subscriber by entering connection data of this subscriber. A distinction is made here between the "Free", "Busy" and "Call Diversion" telephone conditions. The "Free" telephone condition refers to the required subscriber's line being not busy and also not diverted.

If the required subscriber's telephone condition is other than "Free", this is indicated to the switchboard operator. The "Call diversion" (AUL) telephone condition refers to the subscriber having diverted his/her line, for example, to an answering machine or to a different telephone number.

In cases where the identified telephone condition of the required subscriber or the latter's line is "Free", the incoming call is automatically forwarded, if necessary following input of an acknowledgement by the switchboard operator, to the required subscriber.

An advantage of the present invention is that the switchboard apparatus can always operate in "Instant switching" mode, whereby the incoming call is forwarded only if the required subscriber's line is free and not diverted. In this way, the throughput of the switchboard apparatus is optimized and no unnecessary waiting times occur for the caller. Furthermore, there is no risk of the caller being diverted to a busy line or to an answering machine if the caller does not wish this to occur.

If the telephone condition of the required subscriber is not "Free", the switchboard operator can inform the caller who initiated the call of the reason why the caller cannot be switched through. Thus, the caller may decide, for example in the event of the "Call diversion" telephone condition, whether he/she wishes to leave a message for the required subscriber or be connected to a different subscriber.

The entered connection data may include the name of the required subscriber, whereby the line of the relevant required subscriber is automatically identified using stored information. The telephone condition is then automatically determined for the identified line.

Furthermore, the entered connection data may include the extension number of the required subscriber within the, preferably private, telecommunications network. In this case, the stored information does not need to be accessed, since the line is instantly known to the switchboard position by dint of the extension number.

It is furthermore conceivable for the switchboard apparatus to automatically display an alternative subscriber who, for example, works in the same department as the required subscriber, so that the incoming call or the caller can be forwarded to this alternative subscriber.

A distinction advantageously can be made in the "Call Diversion" telephone condition, so that the switchboard operator is notified whether the required subscriber's line is diverted to an answering machine or to a further line; for example, a mobile telephone. The switchboard operator can thus inform the caller precisely where the call is diverted. The caller can then decide whether he/she would nevertheless like to be switched through.

As a further distinction, the switchboard apparatus furthermore recognizes the "Out of Service" and "Call" telephone conditions via the condition device. The "Out of Service" telephone condition indicates, for example, that a specific telephone number is no longer or not currently valid, since the required subscriber has, for example, relocated. The "Call" telephone condition indicates that the required subscriber is either currently being called or himself/herself attempting to set up a call, whereby the call connection has not yet been established.

Additional features an advantages of the present invention are described in, and will be apparent from, the following Detailed Description of the Invention and the Figures.

BRIEF DESCRIPTION OF THE FIGURES

FIG. 3 shows a flowchart illustrating the essential method steps which are performed during the "Free" telephone condition.

FIG. 4 shows a flowchart illustrating the essential method steps which are performed during the "Busy" telephone condition.

FIG. 5 shows a flowchart illustrating the essential method steps which are performed during the "Call diversion" telephone condition.

DETAILED DESCRIPTION OF THE INVENTION

Figure 1:
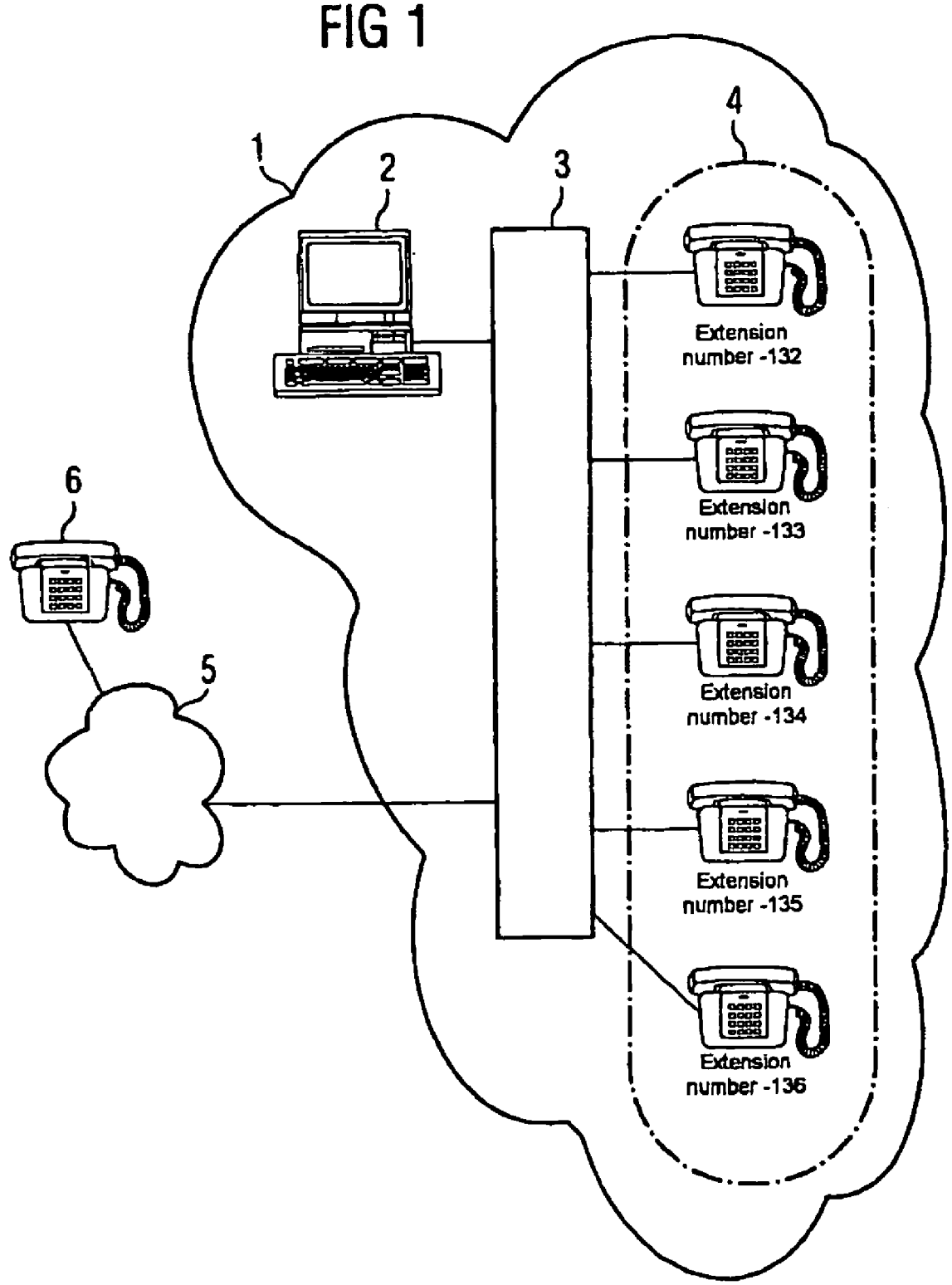
FIG. 1 shows a schematic illustration of the switchboard apparatus according to the present invention in a telecommunications network.

FIG. 1 shows a schematic illustration of the switchboard apparatus 2 according to the present invention in a (preferably private) telecommunications network 1.

The illustrated telecommunications network 1 includes a switchboard apparatus 2, a telecommunications system 3, also frequently referred to in the literature as a PABX system, and (internal) subscribers 4 connected to the telecommunications system 3. For greater clarity, subscribers are also understood in this context to refer to the communications terminal devices allocated to the subscribers, whereby each (internal) subscriber 4 is also allocated his/her own extension number. In the present embodiment, this involves extension number 132 through to extension number 136.

The switchboard apparatus 2 may, for example, include a PC (short for "Personal Computer") which is connected via a "CSTA" (Computer Supported Telecommunication Applications) interface to the telecommunications system 3. Any required data transmission, for example switching commands, between the telecommunications system 3 and the switchboard apparatus 2 is implemented via this interface.

For communication between the switchboard operator and a caller or a different subscriber, the switchboard apparatus has available an additional interface (not shown) for connection to the telecommunications system 3, so that the switchboard operator can, for example, communicate via a headset with the subscribers. However, the switchboard apparatus also can be operated in conjunction with a separate telephone set.

In this way, the described method can be implemented with PC support in stand-alone mode and in combination with additional applications and communications terminal devices as a switchboard apparatus 2, with optional access to an electronic telephone directory.

According to the present invention, an external subscriber 6, referred to below as the caller, is intended, for example, to be connected to an internal subscriber 4. In the present embodiment, the extension number 132 is allocated to the internal subscriber. In the embodiment shown, the call made by the caller 6, from the perspective of the switchboard apparatus 2, forms an incoming call from a public telephone network 5. A call from a different internal subscriber 4, who is switched through by the switchboard apparatus 2 within the (preferably private) telecommunications network 1, also would be conceivable.

According to the present invention, the switchboard apparatus 2 advantageously switches incoming calls in the described "Instant switching" mode; i.e., the call is switched through without an inquiry to the required subscriber 4 if the called line reveals the "Free" telephone condition. However, the method according to the present invention also can be used when switching following an inquiry.

The mode of operation of the switchboard apparatus 2 according to the present invention is explained in detail below with reference to FIG. 2 and the flowcharts according to FIGS. 3 to 5.

Figure 2:
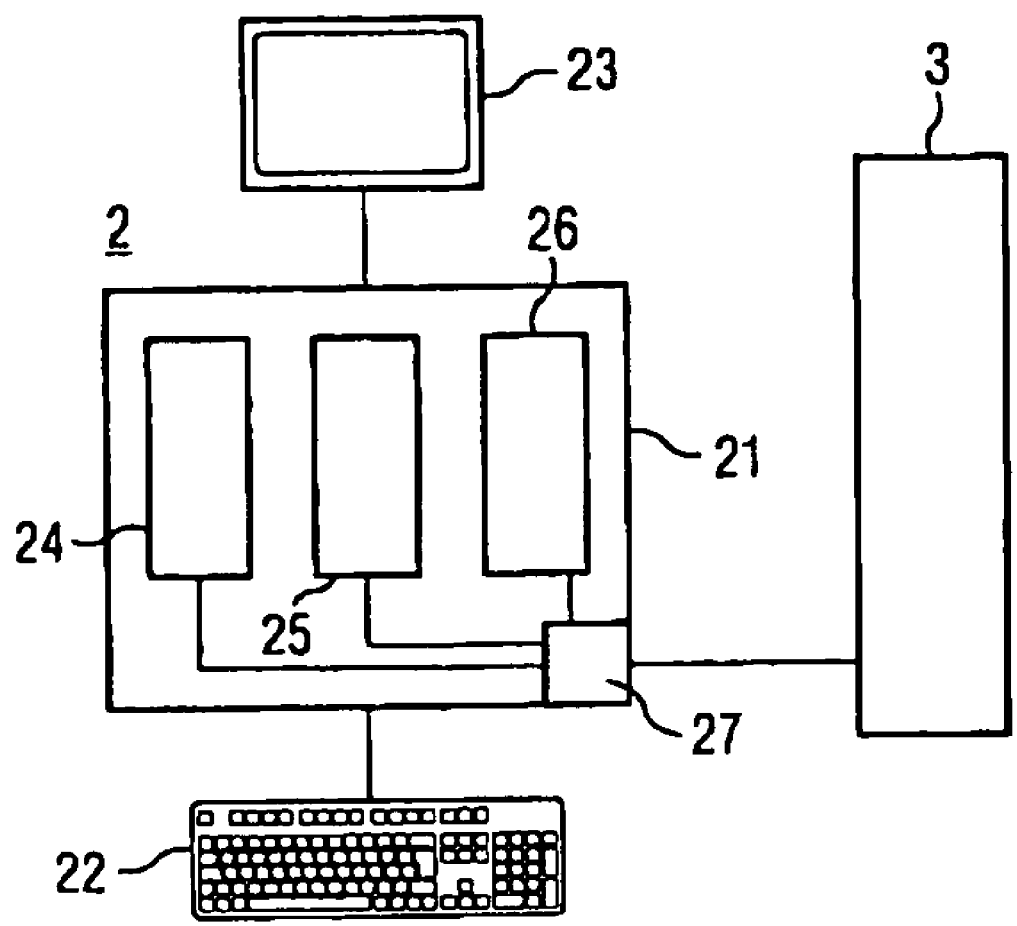
FIG. 2 shows a detailed illustration of the switchboard apparatus according to the present invention.

As shown in FIG. 2, the switchboard apparatus 2 includes a PC 21 with a connected input device 22 (e.g., a keyboard and a mouse) and a connected output device 23 (e.g., a monitor). The PC 21 contains a switching device 24, a data access device 25 and a condition device 26. Furthermore, a headset (not shown), which is used for communication between the switchboard operator and the subscribers (the caller 6 or the required subscriber 4), is connected to the PC 21.

The PC 21 communicates with the telecommunications system 3, such as to transmit switching commands, via an interface 27; for example, according to the CSTA standard.

An incoming call from a caller is registered by the switching device 24 and displayed, inter alia, by the output device 23. The switchboard operator enters the name (generally referred to as the connection data) of the required subscriber 4 via the input device 22. This input is transferred from the switching device 24 to the data access device 25 to search for the required subscriber 4. The data access device 25 searches for the line of the required subscriber 4 (who, for example, in the present embodiment has the extension number 132) from a database (not shown), and transfers the identified extension number to the condition device 26.

The database in which the information relating to the subscribers of the telecommunications network 1 is stored may, for example, be stored locally on the switchboard apparatus 2 or may be centrally stored on the telecommunications system 3. This database is, for example, an electronic telephone directory.

Once the extension number has been transferred, the condition device 26 determines the telephone condition of the required subscriber 4. Here, the condition device 26 may recognize at least the "Free", "Busy", and "Call Diversion" telephone conditions. Furthermore, a distinction can be made in the "Call Diversion" telephone condition between a call diversion to an answering machine or to a different telephone number; for example, a mobile telephone.

FIG. 3 shows a flowchart illustrating the essential method steps which are performed when the required subscriber 4 (in the present embodiment with the extension number 132) is in the "Free" telephone condition.

Once the telephone condition has been determined by the condition device 26, the determined telephone condition is transmitted, if necessary via the data access device 25, to the switching device 24. In the "Free" telephone condition, the switching device 24 automatically switches the incoming call, if necessary following input of an acknowledgement by the switchboard operator, through to the required subscriber 4.

FIG. 4 shows a flowchart illustrating the essential method steps which are performed during the "Busy" telephone condition.

If the condition device 26 determines that the required subscriber 4 is in the "Busy" telephone condition, this telephone condition is conveyed to the data access device 25. The data access device 25 then transmits a message on the output device 23, indicating that the line of the required subscriber 4 is currently busy.

The switchboard operator can then instigate a new subscriber search; for example, by entering a different name. This new subscriber has, for example, the extension number 133. Alternatively, it is also possible for the data access device 25 to output one or more subscribers as an alternative to the required subscriber 4.

If the condition of the (new) required subscriber is "Free", the incoming call is automatically switched through as described to the new subscriber; in the present embodiment, to the extension number 133.

FIG. 5 shows a flowchart illustrating the essential method steps which are performed during the "Call Diversion" telephone condition.

In the "Call Diversion" (AUL) telephone condition, this condition is likewise conveyed from the condition device 26 to the data access device 25 and displayed on the output device 23. The line of the required subscriber 4 may, for example, be diverted to an answering machine or to a telephone number.

The switchboard operator is now able, following an inquiry to the caller 6, to switch through the call, so that the caller 6, if necessary, can leave a message for the required subscriber 4 on the latter's answering machine. Furthermore, the switchboard operator can search for an alternative call party, or the call is terminated at the request of the caller 6.

In this way, communications behavior and throughput are improved, since the relevant caller 6 can be quickly switched through with no risk of the caller 6 being switched through to a busy line or to an answering machine on which the caller 6 would perhaps not like to leave a message.

An example of a subscriber search via the data access device 25 is described below, in which the required subscriber 4 is dialed directly by entering his/her name.

Here, an incoming call on the telecommunications system 3 arrives for switching, whereby the switchboard operator accepts the call. The switchboard operator then searches, via the data access device 25, for the required subscriber 4 or his/her extension number in the database (not shown). The data access device 25 has available, for example, a search algorithm which immediately searches for each letter which is entered, and the first subscriber with the letter combination is always displayed; i.e., selected. This search algorithm offers the advantage that the relevant name is very quickly located.

In combination with the condition device 26, the data access device 25 then sends, with each input on the input device 22, the located entry (telephone number) to the condition device 26. The condition device 26 then decides with reference to the time intervals between two inputs whether a subscriber has been located and whether the condition (for example, "Free", "Busy", "Call Diversion", "Out of Service" or "Call") should be displayed.

The scenario would appear, for example, as follows:

Search for "Metzger Reinhard", where "E" refers to input via the input device 22 and "A" stands for output via the output device 23:

| | |
|---|---|
| E: | M |
| A: | First name with letter M |
| E: | E |
| A: | First name with ME |
| E: | T |
| A: | First name with MET |
| E: | Z |
| A: | METZGER ADOLF |
| E: | Cursor down one line |
| A: | METZGER REINHARD |

As soon as the correct name has been located, either by entering an acknowledgement or at the end of a specific time during which no input has occurred (e.g. two seconds), the telephone condition of the required subscriber 4 is displayed and the caller 6 is switched through if necessary.

Although the present invention has been described with reference to specific embodiments, those skilled in the art will recognize that changes may be made thereto without departing from the spirit and scope of the invention as set forth in the hereafter appended claims.

The invention claimed is:

1. A switchboard apparatus for a telecommunications system for switching an incoming call specifically directed to the switchboard apparatus through to subscribers of a telecommunications network, comprising:
    an input device for entering connection data allocated to a required subscriber;
    a condition device for automatically determining and identifying a telephone condition of the required subscriber before switching the incoming call through to the required subscriber, wherein the condition device distinguishes at least between "Free", "Busy", and "Call Diversion" telephone conditions; and
    a switching device for automatically switching the incoming call through to the required subscriber if the determined telephone condition is "Free," and wherein, in the case of the "Busy" and "Call Diversion" telephone conditions, a corresponding message is displayed by an output device.

2. A switchboard apparatus for a telecommunications system as claimed in claim 1, further comprising a data access device for determining an extension number of the required subscriber from the connection data, which includes at least a name of the required subscriber, using stored information, and for sending the extension number to the condition device to determine the telephone condition of the required subscriber.

3. A switchboard apparatus for a telecommunications system as claimed in claim 1, wherein the connection data includes an extension number of the required subscriber.

4. A switchboard apparatus for a telecommunications system as claimed in claim 1, wherein the data access device displays an alternative subscriber via the output device during the "Busy" and "Call Diversion" telephone conditions.

5. A switchboard apparatus for a telecommunications system as claimed in claims 1, wherein the condition device, during the "Call Diversion" telephone condition, decides whether a relevant line of the required subscriber is diverted to one of an answering machine and a telephone number.

6. A switchboard apparatus for a telecommunications system as claimed in claim 1, wherein the condition device furthermore recognizes "Out of Service" and "Call" telephone conditions.

7. A method for switching an incoming call specifically directed to a switchboard apparatus through to subscribers of a telecommunications network, the method comprising the steps of:
    forwarding the incoming call to the switchboard apparatus;
    inputting connection data of a required subscriber at the switchboard apparatus, wherein an the incoming call is intended to be switched through to the required subscriber;
    automatically determining and recognizing a telephone condition of the required subscriber before switching the incoming call through to the required subscriber, wherein a distinction is made at least between the "Free", "Busy" and "Call Diversion" telephone conditions; and automatically switching the incoming call to the required subscriber if the determined telephone condition is "Free", and displaying a corresponding message in the case of the "Busy" and "Call Diversion" telephone conditions.

8. A method for switching incoming calls through to subscribers of a telecommunications network as claimed in claim 7, wherein the connection data includes a name of the required subscriber, an extension number of the required subscriber is determined from the name using stored information, and the telephone condition of the required subscriber is determined using the extension number.

9. A method for switching incoming calls through to subscribers of a telecommunications network as claimed in claim 7, wherein the connection data includes an extension number of the required subscriber.

10. A method for switching incoming calls through to subscribers of a telecommunications network as claimed in claim 7, the method further comprising the step of displaying an alternative subscriber during the "Busy" and "Call Diversion" telephone conditions.

11. A method for switching incoming calls through to subscribers of a telecommunications network as claimed in claims 7, the method further comprising the step of deciding, during the "Call Diversion" telephone condition, whether a line of the required subscriber is diverted to one of an answering machine and a telephone number.

12. A method for switching incoming calls through to subscribers of a telecommunications network as claimed in claims 7, wherein further telephone conditions "Out of Service" and "Call" are furthermore determined and recognized.

13. A switchboard apparatus for a telecommunications system for switching an incoming call specifically directed to the switchboard apparatus through to subscribers of a telecommunications network, comprising:

an input device for entering connection data that identifies a required subscriber, wherein the connection data is provided by the incoming call;

a condition device for automatically determining and identifying a telephone condition of the required subscriber before switching the incoming call through to the required subscriber; and a switching device for automatically switching the incoming call through to the required subscriber according to the connection data if the determined telephone condition is "Free", and wherein, in the case of a "Busy" or "Call Diversion" telephone condition, a corresponding message is generated in part from the connection data and displayed by an output device.

* * * * *